United States Patent [19]

Gandy

[11] 4,036,182

[45] July 19, 1977

[54] GASOLINE REFRACTIONATOR FOR INTERNAL COMBUSTION ENGINES

[75] Inventor: Mack C. Gandy, Tatum, N. Mex.

[73] Assignee: Dale Gandy, Lovington, N. Mex. ; a part interest

[21] Appl. No.: 686,669

[22] Filed: May 13, 1976

[51] Int. Cl.² .......................... F02B 43/08; F01P 1/06
[52] U.S. Cl. ....................... 123/3; 123/1 A; 123/41.31; 123/119 R
[58] Field of Search .......... 123/1 A, 3, 34 A, 119 CD, 123/122 AC, 122 E, 133, 179 EG, 41.31, 119 R; 210/70, 71, 72; 261/4

[56] References Cited

U.S. PATENT DOCUMENTS

| 1,382,995 | 6/1921 | Lucke | 123/3 |
|---|---|---|---|
| 1,576,766 | 3/1926 | Kloepper | 123/133 |
| 2,970,695 | 2/1961 | Murphey et al. | 210/72 |
| 3,593,694 | 7/1971 | Hilborn | 123/126 |
| 3,688,755 | 9/1972 | Grayson et al. | 123/3 |
| 3,783,841 | 1/1974 | Hirschler | 123/122 E |
| 3,826,237 | 7/1974 | Csicsery et al. | 123/3 |
| 3,882,692 | 5/1975 | Watanabe et al. | 123/41.22 |
| 3,892,211 | 7/1975 | Oyama | 123/133 |

*Primary Examiner*—Wendell E. Burns
*Assistant Examiner*—William Randolph
*Attorney, Agent, or Firm*—Clarence O'Brien; Harvey B. Jacobson

[57] ABSTRACT

A gasoline refractionator for internal combustion engines has a first heat exchanger which receives gasoline from a fuel source and cools the gasoline sufficiently to cause the gasoline to separate into its lighter and heavier ends or components. The separated components are then heated in a second heat exchanger to a temperature at which the components will tend to remain separated even when in physical contact with one another. By imparting a swirl to the heated components, the heavier components will tend to surround the lighter components and provide maximum surface contact between the components during ignition in a cylinder of an internal combustion engine.

15 Claims, 3 Drawing Figures

U.S. Patent
July 19, 1977
4,036,182
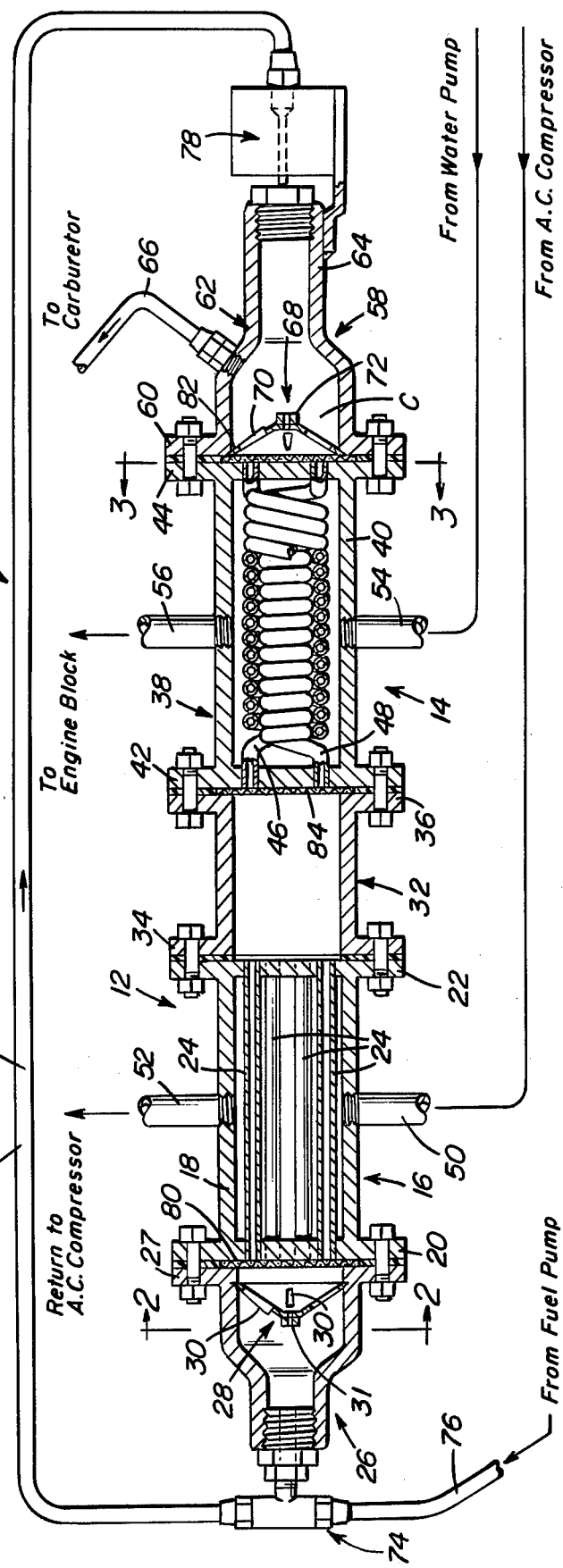
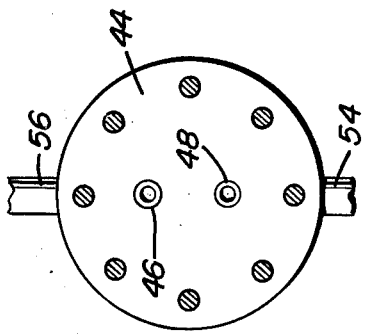
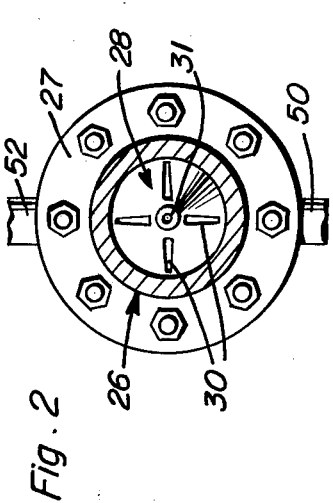

GASOLINE REFRACTIONATOR FOR INTERNAL COMBUSTION ENGINES

BACKGROUND OF THE INVENTION

1. Field of the Invention

This invention relates generally to the art of separating the fuel gasoline into light and heavy ends, or components, just prior to ignition in order to take advantage of the more volatile characteristics of the light components to aid in the complete ignition of the heavier components, thus resulting in more efficient use of the fuel and greater miles per gallon for the vehicle. A result of this is fuel economy and cleaner exhaust emission.

2. Description of the Prior Art

Gasoline is made up of hydrogen and carbon atoms combined into various kinds of molecules called hydrocarbons. The liquid hydrocarbons commonly used to produce gasoline have from 4 to 12 carbon atoms in each molecule and vaporize, or boil, at temperatures from approximately 100° F. (37.78° C) to 400° F. (204.44° C). Each one of these molecules has different qualities and characteristics with regard to the speed and temperature at which it will ignite and burn in a cylinder of an internal combustion engine.

It is generally known that the lighter components of gasoline ingite more readily than the heavier components. Example of apparatus proposed to take advantage of the lighter components during start up of an internal combustion engine can be found in U.S. Pat. No. 3,783,841, issued Jan. 8, 1974, to D. A. Hirschler, Jr., et al., which derives more volatile hydrocarbons from normal gasoline for use during start up of an internal combustion engine by vaporizing and subsequently reliquidifying the fuel.

It is also known in order to increase the efficiency or reliability of internal combustion engines to cool a fuel, such as gasoline, entering the carburetor of an internal combustion engine in order to prevent vapor lock in the fuel system of the engine. This cooling, however, is merely to prevent overheating of the fuel. Examples of cooling devices which prevent vapor lock in carburetors of internal combustion engines can be found in U.S. Pat. Nos. 1,953,809, issued Apr. 3, 1934, to C. H. Kenneweb, and 3,593,694, issued July 30, 1971, to S. G. Hilborn.

U.S. Pat. No. 3,882,692, issued May 13, 1975, to T. Watanabe, et al., discloses a fuel cooling device which employs water accumulated in a reservoir supplied by water draining from the coils of a refrigerant evaporator. Like the vapor lock preventing patents discussed above, however, the cooling device of this patent is intended only to offset the heat added to the fuel in the fuel tank of the vehicle due to the presences of a catalytic converter in the area of the fuel tank.

Other patents which disclose apparatuses for improving the efficiency of operation of an internal combustion engine including the modification of a hydrocarbon fuel, are as follows:

U.S. Pat. Nos:
1,561,738 — Nov. 17, 1925 — R. Miller
2,231,525 — Feb. 11, 1941 — A. Breitling
2,253,717 — Aug. 26, 1941 — B. McInnerney
2,748,758 — June 5, 1956 — E. A. Fairbanks
3,817,273 — June 18, 1974 — C. L. Erwin, Jr.

SUMMARY OF THE INVENTION

It is an object of the present invention to refractionate gasoline just prior to ignition in order to have available to the spark a greater concentration of lighter and more volatile hydrocarbon molecules so that their initial explosion and heat generated will more completely burn the heavier less volatile hydrocarbon molecules contained in the gasoline.

It is another object of the present invention to provide a refractionater for gasoline which can be readily attached to existing internal combustion engines.

It is yet another object of the present invention to provide a refractionator for internal combustion engines which employs energy commonly available on motor vehicles, and much of which is usually wasted.

These and other objects are achieved according to the present invention by providing a gasoline refractionator having: a first heat exchanger arranged for receiving gasoline from a fuel source, such as a fuel tank, and cooling the gasoline sufficiently to cause the gasoline to separate into lighter and heavier components; and a second heat exchanger connected to the first heat exchanger for receiving separated components of gasoline from the first heat exchanger and heating the components to a temperature at which the components will tend to remain separated even when in physical contact with one another. Suitable temperatures for the cooling and heating of the gasoline have been found to be 10° F (minus 12.22° C) for the cooling and 160° F. (71.11° C) for the heating.

The first heat exchanger is preferably partially formed by a cooling section and a subsequent holding and separation chamber which receives the cooled fuel and permits the fuel to separate into layers of lighter and heavier components. The second heat exchanger includes heating means in communication with this holding and separation chamber for removing the components from the chamber in such a manner as to retain the components in separate states. This is advantageously achieved according to the present invention by provision of a pair of coils within the heating section for carrying the components therethrough, with one of the coils entering the holding and separation chamber near the top portion thereof, and the other of the coils entering the holding and separation chamber at the bottom portion thereof.

Another particularly advantageous feature of a refractionator according to the present invention is the provision of a discharge manifold forming part of the second heat exchanger and connected directly to the heating section for causing the heated components to swirl as they are discharged from the refractionator. This swirl tends to place the heavier hydrocarbons on the outside and the lighter components in the center of the flow of components from the refractionator to the carburetor of an internal combustion engine. Thus, the heavier components tend to be on the outside and the lighter components tend to be concentrated near the center, thus allowing the intense heat of ignition of the lighter components to contact and ignite a much greater percentage of the heavier components.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partly schematic, fragmentary, longitudinal sectional view through a refractionator according to the present invention.

FIG. 2 is a fragmentary, sectional view taken generally along the line 2—2 of FIG. 1.

FIG. 3 is a fragmentary, sectional view taken generally along the line 3—3 of FIG. 1.

DESCRIPTION OF THE PREFERRED EMBODIMENTS

Referring now more particularly to the drawings, a gasoline refractionator 10 according to the present invention includes a first heat exchanger 12 which receives gasoline from a fuel source, such as a fuel tank (not shown) of a motor vehicle, and cools the gasoline sufficiently to cause the gasoline to separate into lighter and heavier components. A second heat exchanger 14 is connected to the first heat exchanger for receiving the separated components of gasoline and heating the components to a temperature at which the components will tend to remain separated even when in physical contact with one another.

Heat exchanger 12 includes a cooling section 16 which comprises a hollow shell 18 connected to a source of a coolant, which is preferably a conventional automotive air conditioner. Enclosing the ends of the hollow shell 18 are a pair of plates 20 and 22 which simultaneously form flanges facilitating the connection of the shell 18 to adjacent portions of refractionator 10. Passing through the shell 18 between the plates 20 and 22 is at least one, and preferably a plurality of tubes 24. Each of the tubes 24 has a pair of ends, with one of the ends being arranged in communication with the fuel source and the other of the ends being in communication with the heat exchanger 14.

More specifically, the first heat exchanger 12 further includes an intake manifold 26 connected to the cooling section 16 and to the fuel source. The manifold 26 includes a flange 27 which facilitates attachment of mmanifold 26 to plate 20, and also includes a diffuser 28 of generally frustro-conical configuration and provided with four vanes 30 disposed at, say, 45° from one another, and with a central orifice 31 of, for example, 31 drill diameter for causing the gasoline to be diffused prior to entering into the tubes 24.

Heat exchanger 12 also includes a holding and separation chamber 32 connected to plate 22 of cooling section 16 as by a flange 34, and also connected to the second heat exchanger 14 as by a flange 36. By receiving the cooled gasoline from the tubes 24 of cooling section 16, which tubes pass through apertures appropriately provided in plates 20 and 22, chamber 32 permits the fuel to separate into lighter and heavier components under the influence of gravity. Thus, the components will be continuously forming into layers within chamber 32.

Heat exchanger 14 includes a heating section 38 comprising a hollow sleeve 40 having the ends thereof closed by a pair of plates 42 and 44. Plate 42 is connected to flange 36 of chamber 32 in order to attach heat exchanger 14 to heat exchanger 12. A pair of pipes 46 and 48 are formed into coaxial spirals, with one of the spirals 48 being disposed within the other of the spirals 46. Each of the pipes 46 and 48 has a pair of ends, with one of the ends being disposed in communication with chamber 32 of heat exchanger 12 for receiving the components from chamber 32, one component to each of the pipes 46 and 48. Sleeve 40 is placed in communication with a suitable source of a heating fluid, such as the radiator system of a motor vehicle.

In particular, cooperating ducts 50 and 52 of an automotive air conditioning system of conventional construction tie into the shell 18 in order to pass a refrigerant over the tubes 24. The duct 50 is attached to the compressor (not shown) of the air conditioner in order to receive cooled refrigerant and eventually returning the refrigerant back to the compressor through duct 52. Further, ducts 54 and 56 are associated with sleeve 40 for passing heated water as from the cooling system of the motor vehicle over the pipes 46 and 48. Duct 54 is attached to, for example, the water pump (not shown) of the vehicle cooling system, while duct 56 returns the water to the block of the internal combustion engine with which the refractionator 10 is associated.

In addition to the heating section 38, heat exchanger 14 includes a discharge manifold 58 connected to heating section 38 as by flange 60 cooperating with plate 44. The other of the ends of the pipes 46 and 48 pass through plate 44 and into discharge manifold 58 so as to be directed toward a generally convex chamber C partially formed by a generally concave head 62 which leads into a cylinder 64. A line 66 connects the aforementioned chamber of manifold 58 to a carburetor (not shown) of the associated internal combustion engine.

Discharge manifold 58 is provided with a diffuser 68 similar in construction to diffuser 28 and provided with a plurality of fins 70 and a central orifice 72 which is advantageously about the size of a number 56 drill. When the two components of the gasoline are heated to a temperature, such as 160° F. (71.11° C) at which they tend to remain separated even when in physical contact, they will be exhausted into the aforementioned convex chamber of manifold 58 and through the orifice 72 and four concentrically disposed fins 70 in such a manner as the components will tend to swirl much as water from a bath tub swirls at the drain. The heavier hydrocarbons will be on the outside and the lighter components in the center. This configuration continues to a certain degree to the jets (not shown) of the carburetor where a smoke ring effect is achieved when the stratified liquid is sprayed into a combustion chamber of the internal combustion engine. The heavier components tend to be on the outside and the lighter components tend to be concentrated near the center, thus allowing the intense heat of ignition of the lighter components to contact and ignite a much greater precentage of the heavier components.

A bypass 73 is connected between intake manifold 26 and discharge manifold 58 for the purpose of diverting fuel directly to the carburetor of the engine at the discretion of the operator. A conventional tee 74 connects line 73 to the intake manifold 26 into the line 76 which connects intake manifold 26 to a fuel pump (not shown) and the like, so as to place manifold 26 in communication with a source of fuel. Further, a conventional solenoid operator valve 78 connects line 73 to the cylinder 64 portion of discharge manifold 58 in order to permit the fuel to pass into the discharge manifold 58 and into the line 66 so as to pass to the carburetor of the engine. The use of valve 78 is particularly indicated during warm-up periods for refractionator 10 and during periods when excessive speed is needed by the vehicle. Thus, the refractionator 10 can be bypassed completely without affecting the original performance of the automobile simply by actuating valve 78 in a conventional manner from the driver's seat of the vehicle.

Suitable screens 80 and 82 are conventionally associated with the diffusers 28 and 68 in order to filter particulate matter from the gasoline. As can be readily seen from FIG. 1, these screens 80 and 82 are disposed between the flanges 27 and 60 and the associated plates 20 and 44. Further, an additional screen 84 may be employed between chamber 32 and heating section 38.

In operation, a standard automobile air conditioner (not shown) is used to drop the temperature of a liquid gasoline flowing into refractionator 10 to approximately 10° F. (minus 12.22° C) which is then passed into the holding and separation chamber 32 which allows the heavy molecules to segregate to the bottom of the chamber 32 and the lighter molecules to collect near the top. The cold liquid then passes into two separate colder pipes 46 and 48, with the lighter molecules being collected near the top and the heavier molecules being collected from the bottom of chamber 32, which pipes 46 and 48 are then heated to approximately 160° F. (71.11° C) by utilizing the automobile radiator heat. The hot liquid gasoline is then exhausted directly through a, for example, number 56 drill orifice, and then into the automobile carburetor. Although the two separate streams flow to the carburetor in physical contact with one another, very little molecular intermixing takes place due to the elevated temperature, and additionally to a swirl imparted to the components. This makes it possible for the carburetor to spray into the intake manifold of an internal combustion engine a more orderly arrangement of the hydrocarbon molecules rather than a completely random mixing as does occur without the use of refractionator 10. Tests have found that gas milage of conventional motor vehicles can be more than doubled by use of the invention with a resulting decrease in emissions from the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method of stratifying gasoline into lighter and heavier components prior to entrance of the gasoline into a combustion chamber of an internal combustion engine, comprising the steps of:
    a. cooling the gasoline to a temperature wherein settling of the gasoline into layers of lighter and heavier components occurs and separating the components; and
    b. heating the separated components to a temperature at which the components tend to remain separated when in physical contact with one another.

2. A method as set forth in claim 1, wherein the heating step (b) includes the steps of placing the heated components in contact with one another along a flow path, and imparting a swirl to the heated components for bringing the heavier components outside and surrounding the lighter components and concentrating the lighter components near the center of the flow path for allowing intense heat of ignition of the lighter components to contact and ignite a great percentage of the heavier components.

3. A method as set forth in claim 2, wherein the heating step (b) further includes the step of dividing the components into different flow paths during the heating.

4. A method as set forth in claim 3, wherein the cooling step (a) includes the step of cooling the gasoline to substantially 10° F., and the heating step (b) includes the step of heating the components to substantially 160° F.

5. A method as set forth in claim 1, wherein the heating step (b) includes the step of dividing the components into different flow paths during the heating.

6. A method as set forth in claim 1, wherein the cooling step (a) includes the step of cooling the gasoline substantially 10° F., and the heating step (b) includes the step of heating the components to substantially 160° F.

7. A gasoline refractionator for internal combustion engines, comprising, in combination:
    a. first heat exchanger means for receiving gasoline from a fuel source and cooling the gasoline sufficiently to cause the gasoline to separate into lighter and heavier components; and
    b. second heat exchanger means connected to the first heat exchanger means and receiving separated components of gasoline from the first heat exchanger means for heating separately the components to a temperature at which the components will tend to remain separated even when in physical contact with one another.

8. A structure as defined in claim 7, wherein the first heat exchanger includes a cooling section comprising a hollow shell connected to a source of coolant and at least one tube having a pair of ends disposed passing through the shell, one of the ends of the tube being arranged in communication with the fuel source and the other of the ends of the tube being arranged in communication with the second heat exchanger means.

9. A structure as defined in claim 8, wherein the first heat transfer means further includes an intake manifold connected to the cooling section of the fuel source, the intake manifold including a diffuser arranged for breaking up gasoline being fed into the cooling section.

10. A structure as defined in claim 8, wherein the first heat transfer means further includes a holding and separation chamber connected to the second heat transfer means and in communication with the other of the ends of the tube, the cooled gasoline separating into layers of lighter and heavier components in the holding and separation chamber.

11. A structure as defined in claim 10, wherein the first heat transfer means further includes an intake manifold connected to the cooling section of the fuel source, the intake manifold including a diffuser arranged for breaking up gasoline being fed into the cooling section.

12. A structure as defined in claim 11, wherein the second heat transfer means includes a heating section comprising a hollow sleeve having closed ends and connected to the first heat transfer means, and provided with a pair of pipes formed into coaxial spirals, one of the spirals being disposed within the other of the spirals, each of the pipes having a pair of ends, with one of the ends being in communication with the holding and separation chamber of the first heat transfer means.

13. A structure as defined in claim 12, wherein the second heat transfer means further includes a discharge manifold connected to the heating sections and to the carburetor of an internal combustion engine, the other of the ends of the pipes being in communication with the discharge manifold, the latter having a convex chamber formed opposite the other of the ends of the pipes for forming means for imparting a swirl to the heated components, the other of the ends of the pipes of the heating section discharging through an orifice and into the convex chamber, the swirl imparted to the components causing the heavier component to tend to surround the latter component and allow the intense heat of ignition of the lighter component to contact and ignite a much greater percentage of the heavier component, a bypass means connected to the intake manifold and to the discharge manifold for selectively permitting fuel to bypass the first heat transfer means and heating section with the second heat transfer means in order to operate the associated engine with normal gasoline.

14. A structure as defined in claim 7, wherein the second heat transfer means includes a heating section comprising a hollow sleeve having closed ends and connected to the first heat transfer means, and provided with a pair of pipes formed into coaxial spirals, one of the spirals being disposed within the other of the spirals, each of the pipes having a pair of ends, with one of the ends being in communication with the holding and separation chamber of the first heat transfer means.

15. A structure as defined in claim 14, wherein the second heat transfer means further includes a discharge manifold connected to the heating sections and to the carburetor of an internal combustion engine, the other of the ends of the pipes being in communication with the discharge manifold, the latter having a convex chamber formed opposite the other of the ends of the pipes for forming means for imparting a swirl to the heated components, the other of the ends of the pipes of the heating section discharging though an orifice and into the convex chamber, the swirl imparted to the components causing the heavier component to tend to surround the latter component and allow the intense heat of ignition of the lighter component to contact and ignite a much greater percentage of the heavier component, a bypass means connected to the intake manifold and to the discharge manifold for selectively permitting fuel to bypass the first heat transfer means and heating section with the second heat transfer means in order to operate the associated engine with normal gasoline.

* * * * *